US009865854B2

(12) United States Patent
Fuller et al.

(10) Patent No.: US 9,865,854 B2
(45) Date of Patent: Jan. 9, 2018

(54) LITHIUM ION BATTERY SEPARATORS AND ELECTRODES

(71) Applicant: GM GLOBAL TECHNOLOGY OPERATIONS LLC, Detroit, MI (US)

(72) Inventors: Timothy J. Fuller, Pittsford, NY (US); Ion C. Halalay, Grosse Pointe Park, MI (US); James Mitchell, Bloomfield, NY (US); Lijun Zou, Rochester, NY (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 527 days.

(21) Appl. No.: 14/492,340

(22) Filed: Sep. 22, 2014

(65) Prior Publication Data

US 2015/0093626 A1    Apr. 2, 2015

Related U.S. Application Data

(60) Provisional application No. 61/884,802, filed on Sep. 30, 2013.

(51) Int. Cl.
| | |
|---|---|
| *H01M 2/16* | (2006.01) |
| *H01M 4/131* | (2010.01) |
| *H01M 4/62* | (2006.01) |
| *H01M 4/02* | (2006.01) |

(52) U.S. Cl.
CPC ......... *H01M 2/1653* (2013.01); *H01M 4/131* (2013.01); *H01M 4/628* (2013.01); *H01M 2/1686* (2013.01); *H01M 2004/028* (2013.01)

(58) Field of Classification Search
CPC .......................... H01M 2/1653; H01M 2/1686
USPC ....................................................... 429/144
See application file for complete search history.

(56) References Cited

U.S. PATENT DOCUMENTS

| | | | |
|---|---|---|---|
| 5,130,211 | A | 7/1992 | Wilkinson |
| 6,689,513 | B1 | 2/2004 | Morigaki et al. |
| 7,022,812 | B2 | 4/2006 | Yoshimura et al. |
| 7,282,109 | B2 | 10/2007 | Takata et al. |
| 8,455,140 | B1 | 6/2013 | Huang et al. |

(Continued)

FOREIGN PATENT DOCUMENTS

| | | |
|---|---|---|
| CN | 102130361 A | 7/2011 |
| CN | 102447111 A | 5/2012 |

(Continued)

OTHER PUBLICATIONS

Walkowiak, et al., Macrocycle Carriers for Separation of Metal Ions in Liquid Membrane Process—A Review, Desalination 240, 1999, pp. 186-197.

(Continued)

*Primary Examiner* — Basia A Ridley
*Assistant Examiner* — James M Erwin
(74) *Attorney, Agent, or Firm* — Harness, Dickey & Pierce, P.L.C.

(57) ABSTRACT

A lithium ion battery separator includes a porous film of a polymeric chelating agent. The polymeric chelating agent includes a poly(undecylenyl-macrocycle), where the macrocycle is a chelating agent. A positive electrode includes a structure and a coating formed on a surface of the structure. The structure includes a lithium transition metal based active material, a binder, and a conductive carbon; and the coating includes a poly(undecylenyl-macrocycle), where the macrocycle is a chelating agent. The separator and/or positive electrode are suitable for use in a lithium ion battery.

17 Claims, 4 Drawing Sheets

(56) References Cited

U.S. PATENT DOCUMENTS

| | | |
|---|---|---|
| 8,460,829 B1 | 6/2013 | Huang et al. |
| 8,765,301 B2 | 7/2014 | Halalay et al. |
| 8,785,054 B2 | 7/2014 | Halalay et al. |
| 8,951,654 B2 | 2/2015 | Sachdev et al. |
| 9,028,565 B2 | 5/2015 | Huang |
| 9,138,932 B2 | 9/2015 | Huang |
| 9,324,984 B2 | 4/2016 | Huang et al. |
| 9,331,323 B2 | 5/2016 | Huang |
| 9,346,066 B2 | 5/2016 | Huang |
| 9,412,986 B2 | 8/2016 | Huang |
| 9,525,600 B1 | 12/2016 | Shen |
| 2010/0239900 A1 | 9/2010 | Take et al. |
| 2011/0117413 A1 | 5/2011 | Wang et al. |
| 2011/0151333 A1 | 6/2011 | Halalay et al. |
| 2011/0165459 A1 | 7/2011 | Halalay et al. |
| 2011/0200863 A1 | 8/2011 | Xiao et al. |
| 2011/0236762 A1 | 9/2011 | Huang et al. |
| 2012/0102725 A1 | 5/2012 | Fuller et al. |
| 2012/0156568 A1 | 6/2012 | Kia et al. |
| 2012/0156569 A1 | 6/2012 | Kia et al. |
| 2012/0231321 A1 | 9/2012 | Huang et al. |
| 2012/0308872 A1 | 12/2012 | Huang |
| 2012/0309860 A1 | 12/2012 | Huang |
| 2012/0315384 A1 | 12/2012 | Abd Elhamid et al. |
| 2013/0004857 A1 | 1/2013 | Kia et al. |
| 2013/0052509 A1 | 2/2013 | Halalay et al. |
| 2013/0130093 A1 | 5/2013 | Wang et al. |
| 2013/0131200 A1 | 5/2013 | Huang |
| 2013/0183582 A1 | 7/2013 | Halalay et al. |
| 2014/0272526 A1 | 9/2014 | Huang |

FOREIGN PATENT DOCUMENTS

| | | |
|---|---|---|
| CN | 102668171 A | 9/2012 |
| CN | 104518190 A | 4/2015 |
| DE | 102014113894 A1 | 4/2015 |

OTHER PUBLICATIONS

Komaba, et al., Inorganic Electrolyte Additives to Suppress the Degradation of Graphite Anodes by Dissolved Mn(II) for Lithium-Ion Batteries, Journal of Power Sources 119-121, 2003, pp. 378-382.

Shahrisa, et al., CHemistry of Pyrones, Part 3: New Podands of 4H-Pyran-4-ones; 5 Molecules, 2000, pp. 200-207.

Bruening, et al., Understanding Cation-Macrocycle Binding Selectivity in Single-Solvent Extractions, and Liquid Membrane Systems by Quantifying Thermodynamic Interations; Cation Binding by Macrocycles, Chapter 2, 1990, pp. 112-113, Marcel Dekker Inc., New York and Basel.

Kaifer, et al., Redox Control of Cation Binding in Macrocyclic Systems; Cation Binding by Macrocycles, 1990, Chapert 8, p. 364, Marcel Dekker Inc., New York and Basel.

Atwood, et al., Cation Complexation by Calizarenes; Cation Binding by Macrocycles, 1990, Chapter 15, pp. 581-582, 587; Marcel Dekker Inc., New York and Basel.

Toner, et al., Modern Aspects of Host-Guest Chemistry: Molecular Modeling and Conformationally Restricted Hosts; Crown Ethers and Analogs, 1989, Chapter 3, pp. 81-83, John Wiley and Sons, New York.

Vogtle, et al., Crown-ether-complexes and Selectivity; Crown Ethers and Analogs, 1989, Chapter 4, pp. 208-215, John Wiley and Sons, New York.

Weber, E., New Developments in Crown Ether Chemistry: Lariats, Spherands, and Second-Sphere Complexes; Crown Ethers and Analogs, 1989, Chapter 5, pp. 306-307, 309, 314-315, 320-321, John Wiley and Sons, New York.

Arora, et al., Battery Separators, Chem. Rev. 104, 2004, pp. 4419-4462.

"Teijin Develops More Heat-Resistant Li-Ion Battery Separator", Trading Markets.Com, Sep. 10, 2009, 3 pages, http://www.tradingmarkets.com.

Plastics Today Staff, "TonenGeneral and Toray team up to create lithium-ion battery separator films", plasticstoday.com, Nov. 4, 2009, 2 pages, http://www.plasticstoday.com.

Montanari, F., et al., "Hydroxymethyl Derivatives of 18-Crown-6 and [2.2.2] Cryptand: Versatile Intermediates for the Synthesis of Lipophilic and Polymer-Bonded Macrocyclic Ligands," J. Org. Chem, 1982, 47, 1298-1302.

Babb, D. A., "Synthesis and Metal Ion Complexation of Synthetic Ionophores," A Ph.D. Dissertation in Chemistry, Texas Tech University, Dec. 1985, 149 pages.

Manecke, G., et al., "Polymere Kryptanden, 1", Makromol. Chem. 182, 1973-1984, (1981).

Kopolow, S., et al., "Poly(vinyl macrocyclic polyethers). Synthesis and Cation Binding Properties", vol. 6, No. 1, Jan.-Feb. 1973, pp. 133-142.

Smid, J., et al., "Synthesis of 4'-Vinylbenzocrown Ethers", Organic Preparations and Procedures Int. 8(4), 1976, pp. 193-196.

First Search for Chinese Application No. 20141642253 dated May 6, 2016; 1 page.

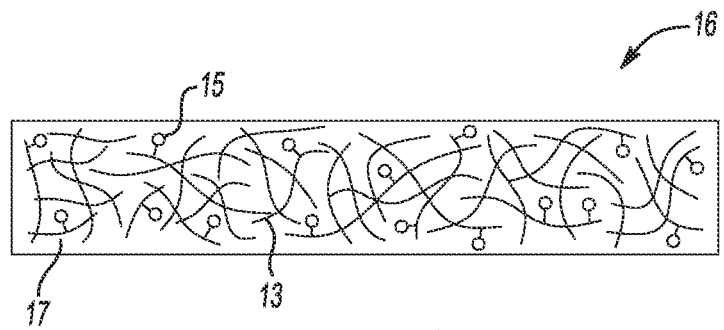
_Fig-1_
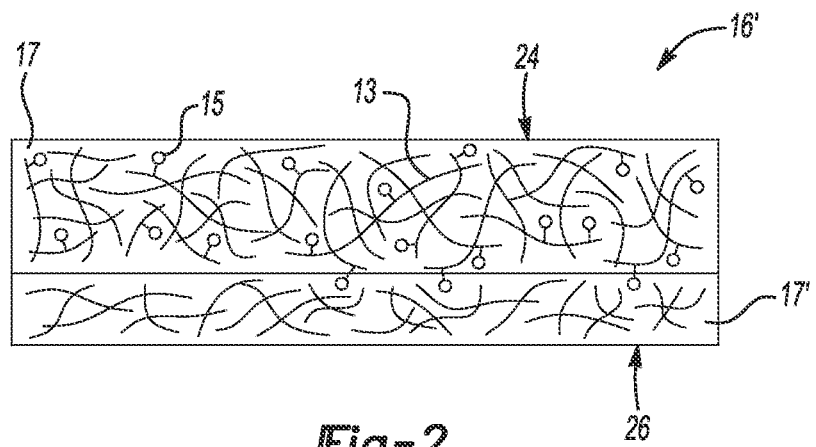
_Fig-2_
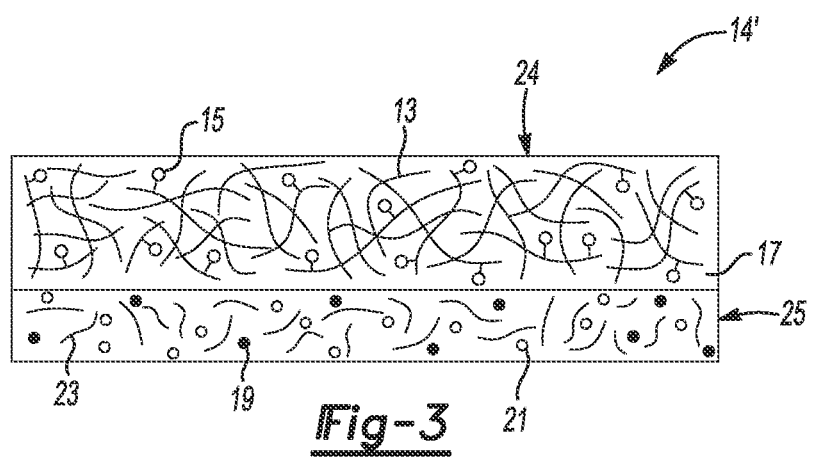
_Fig-3_

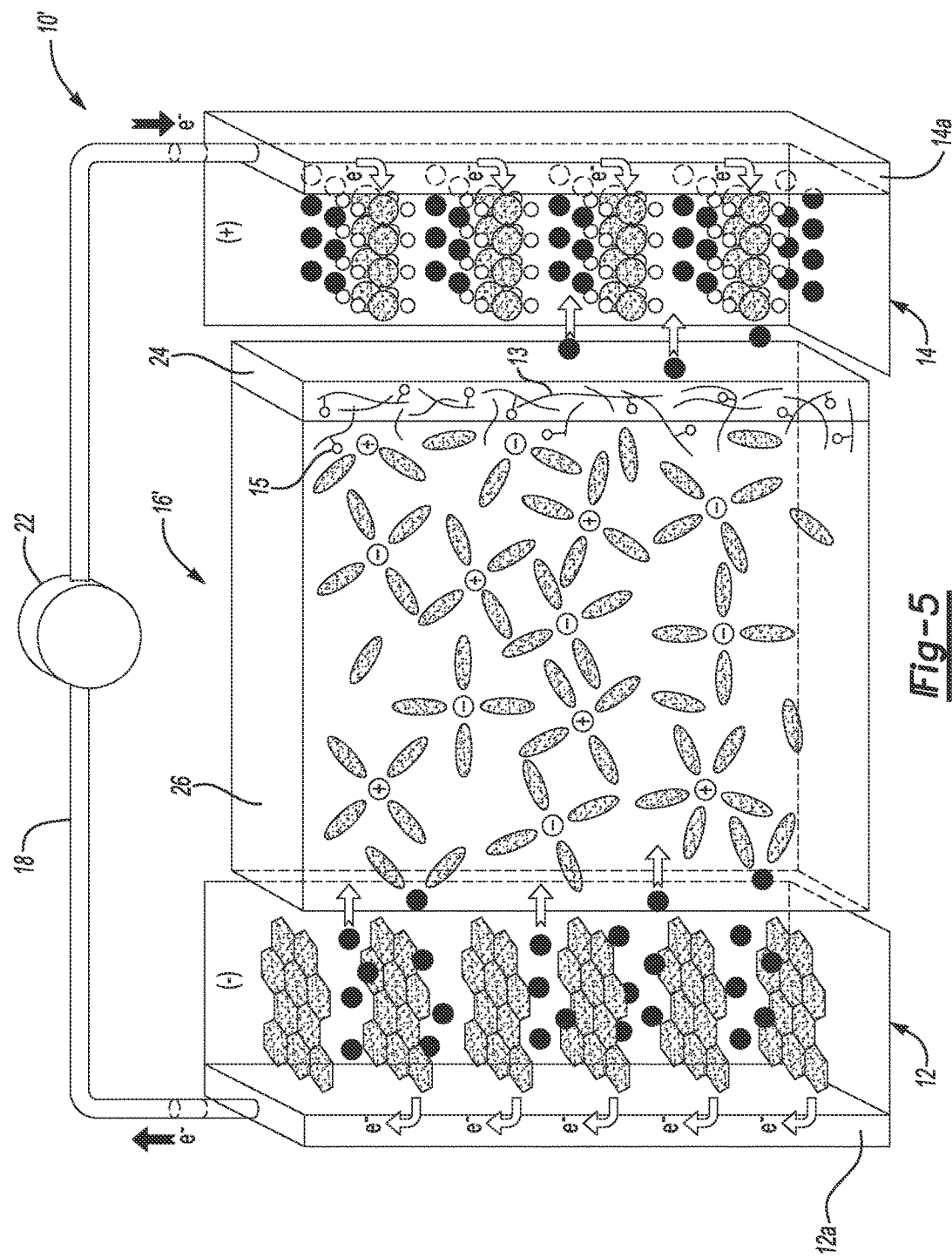

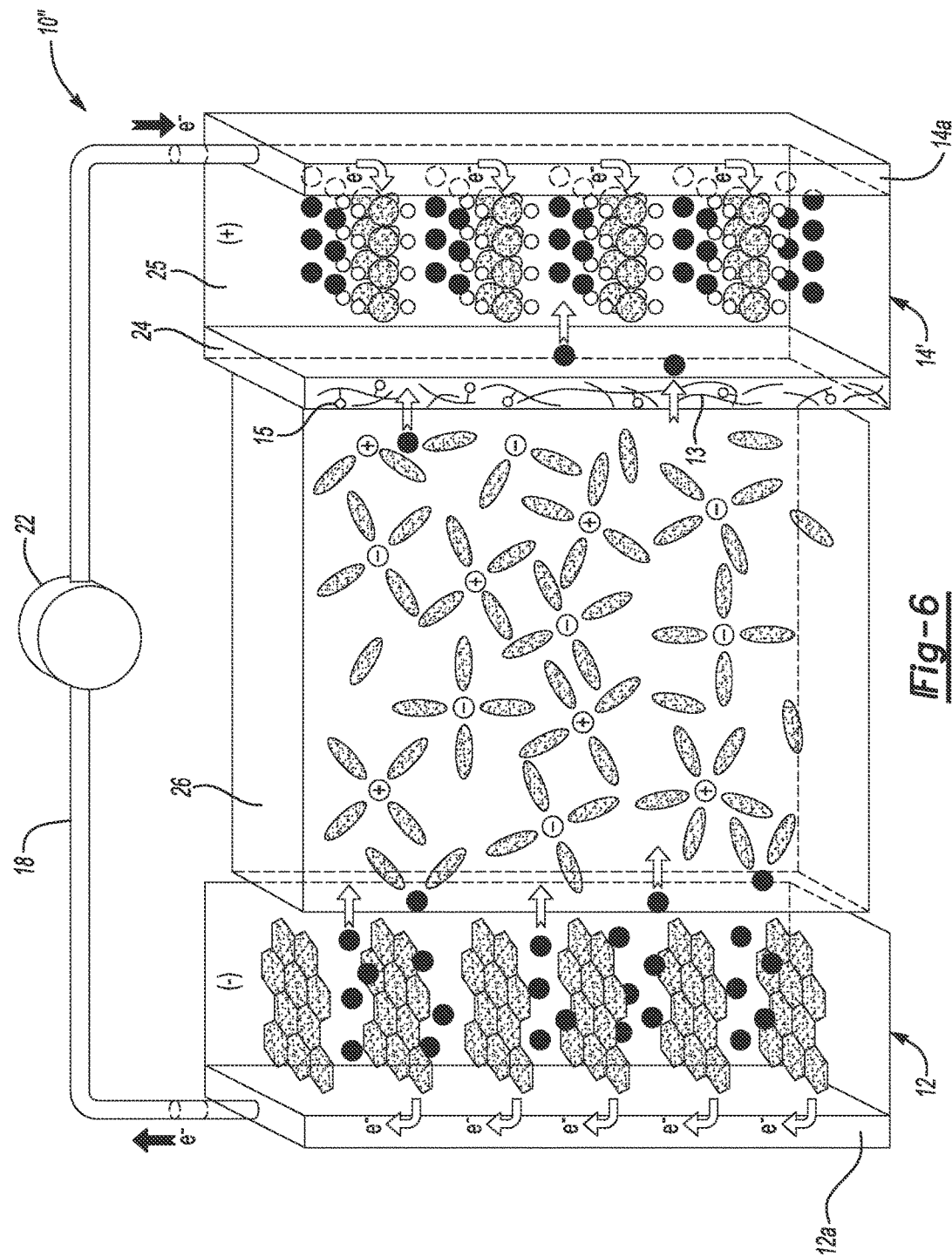

LITHIUM ION BATTERY SEPARATORS AND ELECTRODES

CROSS-REFERENCE TO RELATED APPLICATIONS

This application claims the benefit of U.S. Provisional Patent Application Ser. No. 61/884,802, filed Sep. 30, 2013, which is incorporated by reference herein in its entirety.

TECHNICAL FIELD

The present disclosure relates generally to lithium ion battery separators and electrodes.

BACKGROUND

Secondary, or rechargeable, lithium ion batteries are used in many stationary and portable devices, such as those encountered in the consumer electronic, automobile, and aerospace industries. The lithium ion class of batteries has gained popularity for various reasons including a relatively high energy density, a general nonappearance of any memory effect when compared to other kinds of rechargeable batteries, a relatively low internal resistance, and a low self-discharge rate when not in use. The ability of lithium batteries to undergo repeated power cycling over their useful lifetimes makes them an attractive and dependable power source.

SUMMARY

A lithium ion battery separator includes a porous film of a polymeric chelating agent. The polymeric chelating agent includes a poly(undecylenyl-macrocycle), where the macrocycle is a chelating agent. A positive electrode includes a structure and a coating formed on a surface of the structure. The structure includes a lithium transition metal oxide based active material, a binder, and a conductive carbon; and the coating includes a poly(undecylenyl-macrocycle), where the macrocycle is a chelating agent. The separator and/or positive electrode are suitable for use in a lithium ion battery.

BRIEF DESCRIPTION OF THE DRAWINGS

Features and advantages of examples of the present disclosure will become apparent by reference to the following detailed description and drawings, in which like reference characters correspond to similar, though perhaps not identical, components. For the sake of brevity, reference characters or features having a previously described function may or may not be described in connection with other drawings in which they appear.

FIG. 1 is a schematic, cross-sectional view of an example of a porous separator formed with the polymeric chelating agent disclosed herein;

FIG. 2 is a schematic, cross-sectional view of an example of a porous separator including a porous membrane coated with a porous film of the polymeric chelating agent disclosed herein;

FIG. 3 is a schematic, cross-sectional view of an example of a positive electrode including a structure coated with a porous film of the polymeric chelating agent disclosed herein;

FIG. 5 is a schematic, perspective view of another example of a lithium ion battery during a discharging state, where the separator of the battery includes a porous membrane coated with a porous film of the polymeric chelating agent disclosed herein; and FIG. 6 is a schematic, perspective view of yet another example of a lithium ion battery during a discharging state, where the positive electrode of the battery includes a structure coated with a porous film of the polymeric chelating agent disclosed herein.

Figure 4:
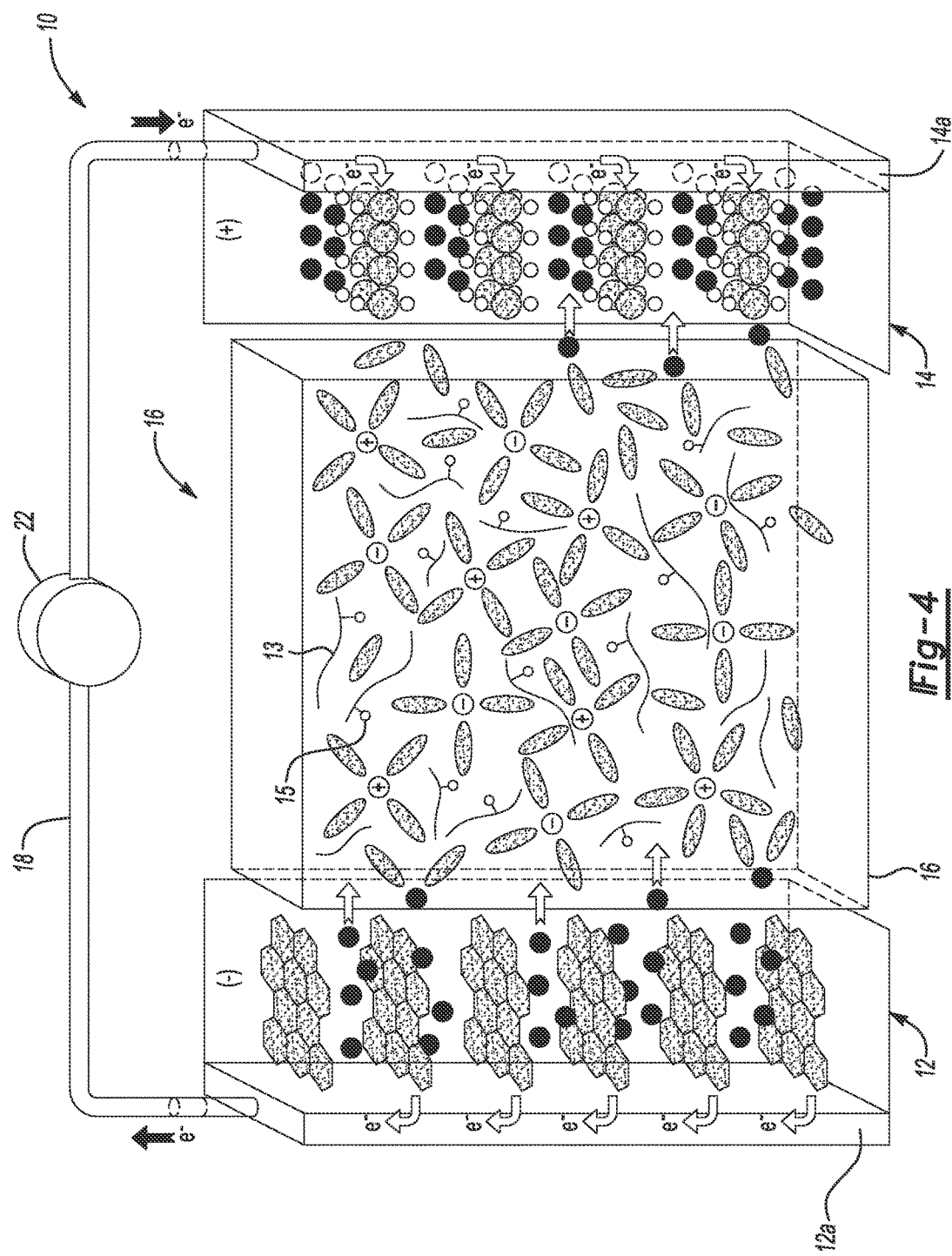
FIG. 4 is a schematic, perspective view of an example of a lithium ion battery during a discharging state, where the porous separator of the battery is formed with an example of the polymeric chelating agent disclosed herein.

The separators shown in FIGS. 4 through 6 are depicted to illustrate the flow of ions between negative and positive electrodes of the respective lithium ion batteries, and thus are not necessarily drawn to scale.

DETAILED DESCRIPTION

A lithium ion battery generally operates by reversibly passing lithium ions between a negative electrode (sometimes called an anode) and a positive electrode (sometimes called a cathode). The negative and positive electrodes are situated on opposite sides of a porous polymer separator that is soaked with an electrolyte solution suitable for conducting lithium ions. Each of the negative and positive electrodes is also accommodated by respective current collector. The current collectors associated with the two electrodes are connected by an interruptible external circuit that allows an electric current to pass between the electrodes to electrically balance the related migration of lithium ions. Further, the negative electrode may include a lithium intercalation host material, and the positive electrode may include a lithium-based active material that can store lithium ions at a higher electric potential than the intercalation host material of the negative electrode. The electrolyte solution may contain a lithium salt dissolved in an aprotic non-aqueous solvent.

It has been found that lithium ion batteries are deleteriously affected by the dissolution of transition metal cations from the positive electrode, which results in accelerated capacity fading, and thus loss of durability in the battery. The transition metal cations migrate from the positive electrode to the negative electrode of the battery, leading to its "poisoning". In one example, a graphite electrode is poisoned by $Mn^{+2}$, $Mn^{+3}$ or $Mn^{+4}$ cations that dissolve from spinel $Li_xMn_2O_4$ of the positive electrode. For instance, the $Mn^{+2}$ cations may migrate through the battery electrolyte, and deposit onto the graphite electrode. When deposited onto the graphite, the $Mn^{+2}$ cations become Mn metal. It has been shown that a relatively small amount (e.g., 90 ppm) of Mn metal can poison the graphite electrode and prevent reversible electrode operation, thereby deleteriously affecting the useful life of the battery. The deleterious effect of the Mn deposited at the negative electrode is significantly enhanced during battery exposure to above-ambient temperatures (>40° C.), irrespective of whether the exposure occurs through mere storage (i.e., simple stand at open circuit voltage in some state of charge) or during battery operation (i.e., during charge, during discharge, or during charge-discharge cycling).

The poisoning of the lithium ion battery by transition metals dissolving from the positive electrode may be reduced or prevented by incorporating an example of the separator and/or positive electrode disclosed herein into the battery. The separator(s) and the positive electrode(s) disclosed herein include a polymeric chelating agent, which, as used herein, is a macrocyclic polymer that includes a chelating agent(s) bonded to a salt of polyundecylenic acid (i.e., a poly(undecylenyl-macrocycle) where the macrocycle is a chelating agent). The polymeric chelating agent may form the separator itself, or may be incorporated as a coating on another porous membrane to form the separator or as a coating on a structure of a positive electrode.

Suitable chelating agents include metal ionophores, which, as used herein, are chemical compounds that bind to particular ions (e.g., $Mn^{+2}$ or other transition metal cations) while allowing the passage of lithium ions. Inside the battery, the chelating agent tethered to the poly(undecylenyl) backbone effectively traps the unwanted metal cations so that movement of lithium ions across the microporous polymer separator is not affected during operation of the battery. In an example, the chelating agent selectively complexes with the unwanted metal cations, for example, by immobilizing the metal cations (e.g., $Co^{+2}$, $Fe^{+2}$, $Mn^{+2}$, etc.) that may dissolve into the electrolyte solution from the positive electrode. The chelating agent thus operates as a metal cation scavenger molecule that traps and immobilizes the unwanted metal cations to prevent the migration of the metal cations through the electrolyte solution and to the negative electrode. It is to be understood that the chelating agents complex less strongly with lithium ions (e.g., a single trapping site out of each one hundred sites are occupied by a Li cation compared to a Mn cation), and thus does not adversely affect the movement of lithium ions between the negative and positive electrodes.

Furthermore, the poly(undecylenic acid) precursor to the functionalized salt offers many advantages, such as being cost effective and readily formable into films, coatings, fibers, membranes, etc. It has also been found that the monomer, trimethylsilyl undecylenate, used to form poly (undecylenic acid), can be readily polymerized with other olefins to form copolymers, terpolymers, etc., and that the poly(undecylenic acid) precursor can be readily functionalized with the chelating agents after conversion to its acid chloride, poly(undenlenoyl chloride). All of these properties render the poly(undecylenyl-macrocycle) desirable from a manufacturing standpoint.

In addition, it is believed that the polymer backbone of the polymeric chelating agent disclosed herein may be able to efficiently operate at above-ambient temperatures without performance degradation. As such, the thermal management system of the lithium ion battery may be able to be simplified or even eliminated.

FIGS. 1 through 3 illustrate different examples of the polymeric chelating agent disclosed herein.

In FIG. 1, the polymeric chelating agent forms the lithium ion battery separator 16. In this example, the separator 16 itself is a porous film of the poly(undecylenyl-macrocycle). In FIG. 1, the poly(undecylenyl) backbone is represented by reference numeral 13, the macrocycle or chelating agent bonded thereto is represented by reference numeral 15, and the pores in the film are represented by reference numeral 17.

The polymer chelating agent may be formed using a Ziegler-Natta polymerization during which trimethylsilyl undecylenate (i.e., undecylenic acid-trimethylsilyl ester) is polymerized, either alone or in combination with another olefin, in the presence of a Ziegler-Natta catalyst to form poly(undecylenic acid) or a copolymer, terpolymer, etc. thereof.

When other olefin(s) are used, about one-half of the undecylenate precursor charged in the reaction is incorporated into the reaction polymeric product. Examples of the other olefin(s) include ethylene, propene, butene, pentene, hexene, etc.

The poly(undecylenic acid), or the copolymer, terpolymer, etc., thereof, is then functionalized with a desired chelating agent. The poly(undecylenic acid), or the copolymer, terpolymer, etc. thereof, is reacted with thionyl chloride in some suitable halide solvent (e.g., methylene chloride) or in toluene and pyridine to form poly(undecylenoyl chloride).

The poly(undecylenoyl chloride) is reacted with a chelating agent precursor, which is the salt form of the desired chelating agent. The desired chelating agent may be a crown ether, a crown ether having at least one ether oxygen substituted with a heteroatom, a podand, a lariat ether, a calixarene, a calixcrown, or combinations thereof (examples of which will be described below). Any salt of any of these chelating agents may be used in the process. Example salts include lithio-oxyalkyl-crown ethers, lithio-aza-15-crown-5

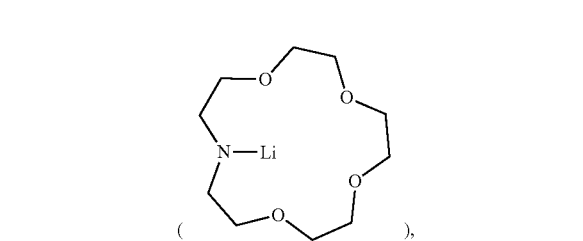

or the like. As illustrated by these examples, the salt precursor of the chelating agent may have a cation (e.g., a lithium cation ($Li^+$), a sodium cation ($Na^+$), or another alkali metal cation, such as a cesium cation ($Cs^+$) or a rubidium cation ($Rb^+$)) attached thereto. This reacts with poly(undecylenoyl chloride) to form an ester or an amide group to tether the chelating agent. At least some of the chloride groups on the poly(undecylenoyl chloride) act as attachment points for the chelating agent. This reaction forms the poly(undecylenyl-macrocycle) and also generates some salt (i.e., such as LiCl). In some instances, the ester or amide acts as a linking group to connect the chelating agent to the polymer backbone 13 (see the reaction scheme below with $NR_1R_2$); and in other instances in addition to the ester or amide, another group (such as —$CH_2$—, an ethoxy group, a methoxy group, an undecylenyl group, or the like) is introduced (see the reaction scheme below with RO). More generally, the additional group can be an alkyl, an ester, an amide, an ether, or an isocyanate. Examples of the reaction are shown below:

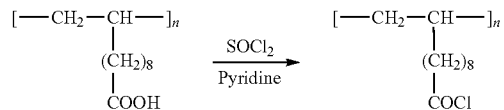

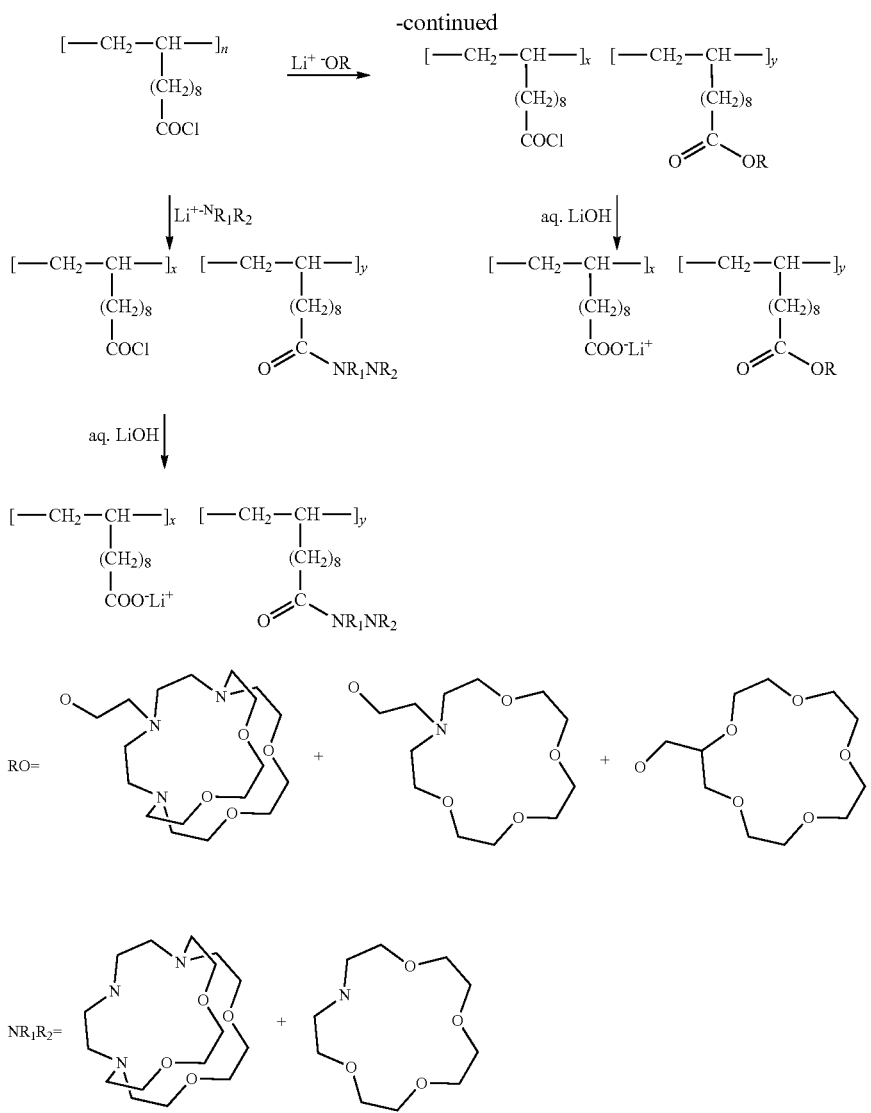

The reaction mixture of the poly(undecylenoyl chloride) and the tethered chelating agent precursor is further reacted with an aqueous base solution (e.g., lithium hydroxide) to hydrolyze any unreacted halide groups. All of these reactions complete the formation of the poly(undecylenyl-macrocycle), or the polymer backbone 13 having the macrocycle (i.e., chelating agent(s)) 15 bonded thereto. Additional purification processes may also be performed.

Furthermore, other reaction schemes that will bond the chelating agent(s) 15 to the poly(undecylenyl) backbone 13 may also be used. For example, isocyanate groups may be used to tether macrocycles to the undeclenyl group by the reaction schemes shown below:

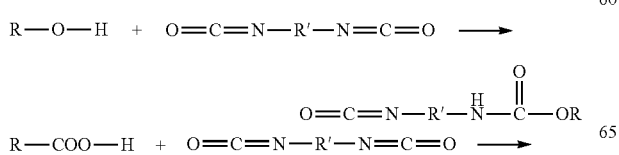

-continued

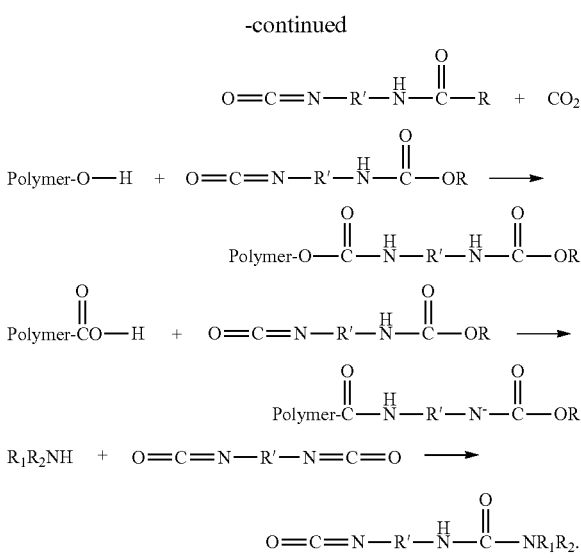

A macrocycle such as

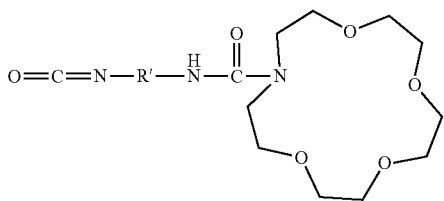

can attach directly to the acid groups of poly(undecylenic acid), and conversion of the unreacted acid groups can be converted to poly(lithium undecylate-undecylenyl macrocycle) by titration with aqueous lithium hydroxide in the presence of aqueous lithium chloride.

To form the separator 16 shown in FIG. 1, the poly (undecylenoyl chloride) or the polyundecylenic acid may be processed into a film or membrane before or after the reactions to generate the poly(undecylenyl-macrocycle). In some instances it may be more desirable to process the poly(undecylenoyl chloride) or the polyundecylenic acid rather than the poly(undecylenyl-macrocycle). Melt processing, extrusion, or some other method may be used to stretch the poly(undecylenoyl chloride) or the polyundecylenic acid into a porous film or membrane. In this example, the porous film or membrane of poly(undecylenoyl chloride) or the polyundecylenic acid is functionalized and further reacted to form the poly(undecylenyl-macrocycle) as previously described.

As illustrated in FIG. 1, this example of the separator 16 has pores 17 formed throughout the poly(undecylenyl) backbone 13. The chelating agent 15 is attached to the poly (undecylenyl) backbone 13. In this example, the bonded chelating agent 15 is part of the separator matrix and may be present inside of the open pores 17.

As mentioned above, the chelating agent 15 that is attached to the poly(undecylenyl) backbone 13 may be a crown ether, a crown ether having at least one ether oxygen substituted with a heteroatom, a podand, a lariat ether, a calixarene, a calixcrown, or combinations thereof. A generalized description of some of these chelating agents is provided herein.

A crown ether is a cyclic ether in which the ether ring includes oxygen atoms that can complex with a transition metal cation. In many examples, the cyclic ether is a macrocycle. Some or all of the oxygen atoms in the ether ring may be exchanged for nitrogen atoms, a class of crown ethers known as azacrowns, or sulfur atoms, a class of crown ethers known as thiacrowns. The crown ether may be monocyclic, in which the crown ether forms a somewhat two-dimensional ring for complexing with a transition metal cation, or polycyclic, in which the crown ether forms a more three-dimensional cage for complexing with a metal cation. One example of a polycyclic crown ether is a cryptand (such as, e.g., cryptand [2.2.2], cryptand [2.2.1], and cryptand [2.1.1]; the "[$N_1.N_2.N_3$]" notation is a short-hand proposed by Jean-Marie Lehn). One or more oxygen atoms in the cryptand or other crown ether may also be substituted at any location along its polyether ring by any of a variety of atoms or functional groups known to those skilled in the art. For example, the cryptand may include sulfur substituted at one or more oxygen sites, or may include nitrogen substituted at one or more oxygen sites.

It is believed that crown ethers having structures where i) the size of the cavity defined by the crown structure has a diameter that is close to the size of the ion (e.g., the transition metal cation) to be trapped, and ii) a permanent dipole moment possesses a maximum charge for any given separation between positive and negative charges of the structure are most desirable for use in the examples of the lithium battery disclosed herein. For instance, a chelating agent possessing a permanent dipole moment (such as crown ethers having an odd number of oxygen atoms in its polyether ring (e.g., 9-crown-3,15-crown-5, etc.), and further have thia- (i.e., sulfur) or aza- (i.e., nitrogen) substitutions that tend to break the symmetry of the charge distribution of a symmetric crown ether (such as 12-crown-4 or 18-crown-6) or an increase in the charge separation in an asymmetric chelating agent) will align counter-parallel to an externally applied electric field to minimize its potential energy in the applied field. This will, in effect, maximize the ion trapping ability of the crown ether.

Further, a podand is an acyclic polyether ligand that includes donor-group-bearing arms that can complex with a metal cation. A lariat ether is a crown ether that includes a donor-group-bearing side-arm that provides additional metal cation binding sites beyond those present on the polyether ring. A calixarene is a metacyclophane of methylene-bridged phenol units, and is generally found in one of a cone, partial cone, 1,2-alternate, or 1,3-alternate conformation. A calixcrown is a calixarene that includes a polyether ring that links two phenolic oxygens of the calixarene framework. The indifference these chelating agents show towards complexing with lithium ions is likely ascribed to their relatively large polyether ring or cage structures and/or the spatial orientation of their functional donor-group-bearing arms when compared to the relatively small size of lithium ions. Analogs and structurally related molecules of the chelating agents just mentioned may also be employed.

A list of some chelating agents 15 that may be used in the polymeric chelating agent disclosed herein include:

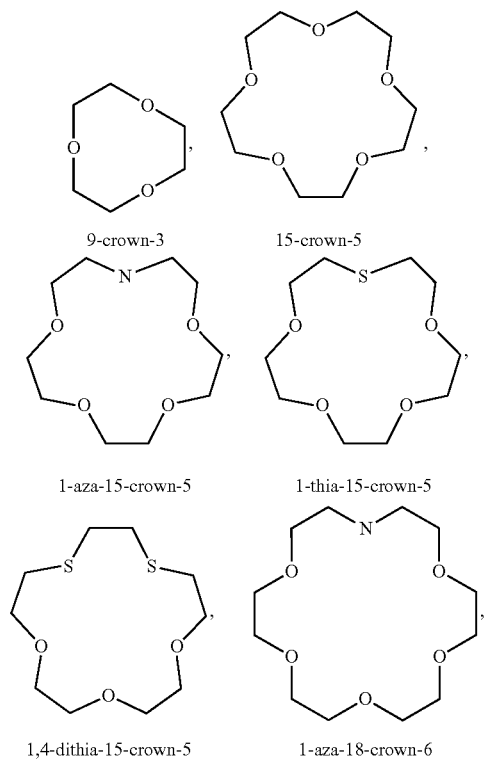

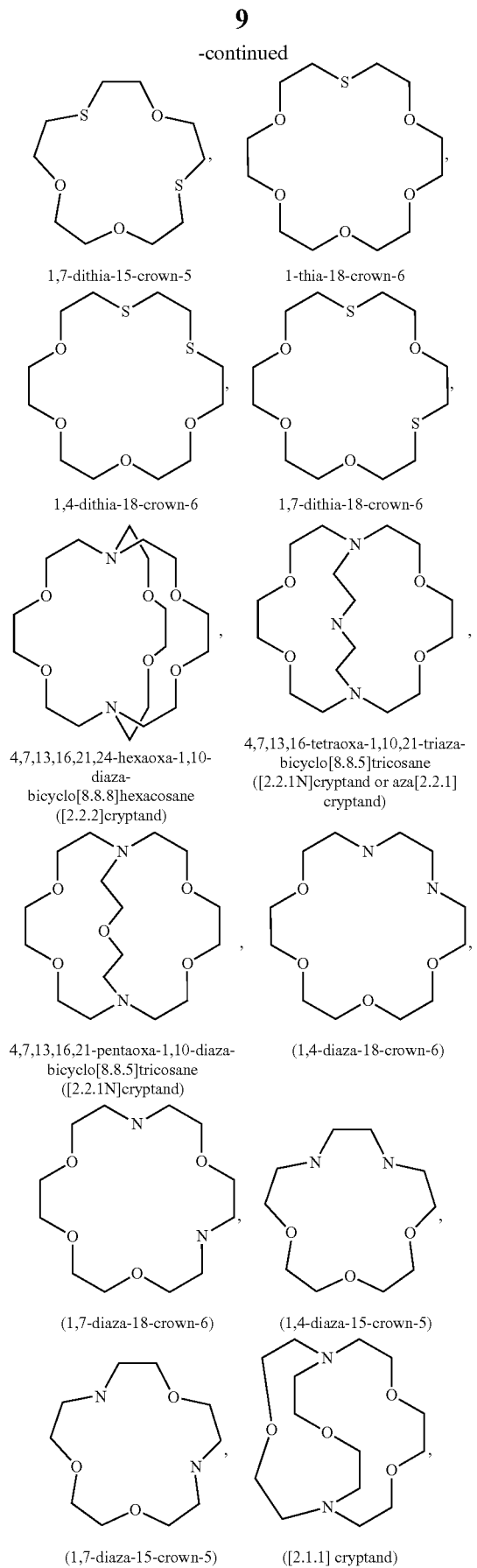
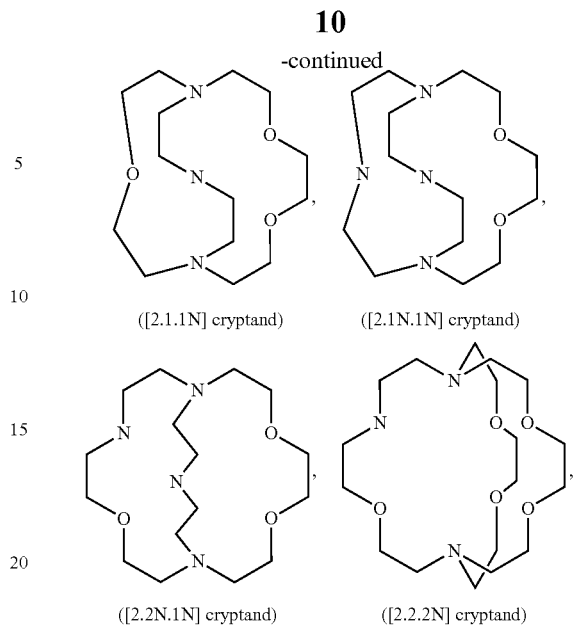

[2.2N.2N]cryptand, and combinations thereof. Any hydrogen atoms in these structures are assumed.

Referring now to FIG. 2, the polymeric chelating agent is in the form of a coating 24 on a microporous membrane 26. Together, the coating 24 and the microporous membrane 26 form another example of the lithium ion battery separator 16'. Since the coating 24 is formed on the surface of a microporous membrane 26, at least some of the polymeric chelating agent may migrate into the pores 17' of the microporous membrane 26.

The polymeric chelating agent may be formed as described in reference to FIG. 1, and includes the chelating agent 15 attached to the poly(undecylenyl) backbone 13. The resulting coating 24 also includes the pores 17. In an example of coating the microporous membrane 26 with the polymeric chelating agent, the polymeric chelating agent may be suspended in tetrahydrofuran, and this suspension may be deposited on or otherwise exposed to the microporous polymer membrane 26. For example, a wet film of the suspension may be applied to the microporous polymer membrane 26.

Examples of suitable microporous membranes 26 include a polyolefin. The polyolefin may be a homopolymer (derived from a single monomer constituent) or a heteropolymer (derived from more than one monomer constituent), and may be either linear or branched. If a heteropolymer derived from two monomer constituents is employed, the polyolefin may assume any copolymer chain arrangement including those of a block copolymer or a random copolymer. The same holds true if the polyolefin is a heteropolymer derived from more than two monomer constituents. As examples, the polyolefin may be polyethylene (PE), polypropylene (PP), a blend of PE and PP, or multi-layered structured porous films of PE and/or PP. Commercially available polyolefin porous membranes 26 include CELGARD® 2500 (a monolayer polypropylene separator) and CELGARD® 2320 (a trilayer polypropylene/polyethylene/polypropylene separator) available from Celgard LLC.

In another example, the microporous membrane 26 may be formed from another polymer chosen from expanded polytetrafluoroethylene (ePTFE), polyethylene terephthalate (PET), polyvinylidene fluoride (PVdF), polyamides (Nylons), polyurethanes, polycarbonates, polyesters, polyetheretherketones (PEEK), polyethersulfones (PES), polyimides (PI), polyamide-imides, polyethers, polyoxymethylene (e.g., acetal), polybutylene terephthalate, polyethylenenaphthenate, polybutene, polyolefin copolymers, acrylonitrile-butadiene styrene copolymers (ABS), polystyrene copolymers, polymethylmethacrylate (PMMA), polyvinyl chloride (PVC), polysiloxane polymers (such as polydimethylsiloxane (PDMS)), polybenzimidazole (PBI), polybenzoxazole (PBO), polyphenylenes (e.g., PARMAX™ (Mississippi Polymer Technologies, Inc., Bay Saint Louis, Miss.)), polyarylene ether ketones, polyperfluorocyclobutanes, polyvinylidene fluoride copolymers and terpolymers, polyvinylidene chloride, polyvinylfluoride, liquid crystalline polymers (e.g., VECTRAN™ (Hoechst AG, Germany) and ZENITE® (DuPont, Wilmington, Del.)), polyaramides, polyphenylene oxide, and/or combinations thereof. It is believed that another example of a liquid crystalline polymer that may be used for the membrane 26 is poly(p-hydroxybenzoic acid). In yet another example, the membrane 26 may be a combination of one of these polymers and a polyolefin (such as PE and/or PP). Some other commercially available separators are available from Entek International, Asahi-Kasei Corporation, Toray Industries, and SK Energy.

The microporous membrane 26 may contain a single layer or a multi-layer laminate fabricated from either a dry or wet process, by solvent casting, by a non-woven fiber laying process, or by any other process for making a microporous membrane 26 with properties suitable for application in Li-ion batteries. For example, in one example, a single layer of the polyolefin may constitute the entirety of the microporous membrane 26. In another example, a single layer of one or a combination of any of the polymers from which the microporous membrane 26 may be formed (e.g., the polyolefin and/or one or more of the other polymers listed above for the microporous membrane 26) may constitute the entirety of the microporous membrane 26. As another example, however, multiple discrete layers of similar or dissimilar polyolefins and/or polymers for the microporous membrane 26 may be assembled into the microporous membrane 26. In one example, a discrete layer of one or more of the polymers may be coated on a discrete layer of the polyolefin for the microporous membrane 26. Further, the polyolefin (and/or other polymer) layer, and any other optional polymer layers, may further be included in the microporous membrane 26 as a fibrous layer to help provide the microporous membrane 26 with appropriate structural and porosity characteristics. A more complete discussion of single and multi-layer lithium ion battery separators, and the dry and wet processes that may be used to make them, can be found in P. Arora and Z. Zhang, "Battery Separators," Chem. Rev., 104, 4424-4427 (2004).

Referring now to FIG. 3, the polymeric chelating agent is in the form of a coating 24 on a structure 25. Together, the coating 24 and the structure 25 form an example of a positive electrode 14'.

The polymeric chelating agent may be formed as described in reference to FIG. 1, and includes the chelating agent 15 attached to the poly(undecylenyl) backbone 13. The resulting coating 24 also includes the pores 17. In an example of coating the structure 25 with the polymeric chelating agent, the polymeric chelating agent may be suspended in tetrahydrofuran, and this suspension may be deposited on or otherwise exposed to at least the surface of the structure 25 to be positioned adjacent to a microporous membrane 26 (not shown in FIG. 3) in a lithium ion battery. While not shown in FIG. 3, it is to be understood that the entire structure 25 may be encapsulated in the coating 24.

The structure 25 includes a lithium transition metal based active material 19, a conductive carbon 21, and a binder 23. It is to be understood that any lithium transition metal based active material 19 that can sufficiently undergo lithium intercalation and deintercalation while functioning as the positive terminal of a lithium ion battery may be used. Examples of the active material 19 include at least one of spinel lithium manganese oxide ($LiMn_2O_4$), lithium cobalt oxide ($LiCoO_2$), a manganese-nickel-oxide spinel [$Li(Mn_{1.5}Ni_{0.5})O_2$], a layered nickel-manganese-cobalt oxide [$Li(Ni_{1-x}Mn_{1-y}Co_{x+y})O_2$], $LiNiO_2$, $Li_2MSiO_4$ (M=Co, Fe, Mn), a lithium iron polyanion oxide, such as lithium iron phosphate ($LiFePO_4$) or lithium iron fluorophosphate ($Li_2FePO_4F$), or a lithium rich layer-structure cathode, such as $xLi_2MnO_3$-$(1-x)LiMO_2$ (M is composed of any ratio of Ni, Mn and Co). Other lithium-based active materials may also be utilized, such as $LiNi_{1-x}Co_{1-y}M_{x+y}O_2$, $LiMn_{1.5-x}Ni_{0.5-y}M_{x+y}O_4$ (M is composed of any ratio of Al, Cr, Ti, and/or Mg), stabilized lithium manganese oxide spinel ($Li_xMn_{2-y}M_yO_4$, with M is composed of any ratio of Al, Cr, Ti, and/or Mg), lithium vanadium oxide ($LiV_2O_5$), $Li_2MSiO_4$ (M is composed of any ratio of Co, Fe, and/or Mn), $xLi_2MnO_3$-$(1-x)LiMO_2$ (M is composed of any ratio of Ni, Mn and/or Co), and any other nickel-manganese-cobalt material. By "any ratio" it is meant that any element may be present in any amount. So, in some examples, M could be Ni, with or without Co and/or Mn, or any other combination of the listed elements. In another example, anion substitutions may be made in the lattice of any example of the lithium transition metal based active material to stabilize the crystal structure. For example, any O atom may be substituted with an F atom.

The conductive carbon 21 of the structure 25 may be any high surface area carbon, such as acetylene black, that intermingles with the lithium transition metal based active material 19. "High surface area carbon" as used herein is meant to include any carbon having a BET (=Brunauer-Emmett-Teller) surface area ranging from 50 to 2,000 $m^2/g$. The conductive carbon 21 may be added to ensure electron conduction between a current collector of the lithium ion battery and the active material particles 19 of the positive electrode 14'.

The binder 23 of the structure 25 may be any polymeric binder that is capable of structurally holding the lithium-based active material 19 together. Examples of the binder 23 include polyvinylidene fluoride (PVdF), an ethylene propylene diene monomer (EPDM) rubber, and/or carboxymethyl cellulose (CMC).

FIGS. 4 through 6 illustrate different examples of the lithium ion battery 10, 10', 10" incorporating different examples of the polymeric chelating agent disclosed herein. The batteries 10, 10', 10" generally include a negative electrode 12, a negative-side current collector 12a, a positive electrode 14, a positive-side current collector 14a, and a separator 16, 16', or 26 positioned between the negative electrode 12 and the positive electrode 14. It is to be understood that the separator 16, 16', 26 and/or the positive electrode 14 may include the chelating agent 15 and poly(undecylenyl) backbone 13 coated thereon. Each example of the lithium ion battery 10, 10', 10" also includes an interruptible external circuit 18 that connects the negative electrode 12 and the positive electrode 14.

Referring now to FIG. 4, the lithium ion battery 10 includes the separator 16 shown in FIG. 1 disposed between a negative electrode 12 and a positive electrode 14. As discussed above, the separator 16 is formed of the poly (undecylenyl-macrocycle). The separator 16, which operates as both an electrical insulator and a mechanical support, is sandwiched between the negative electrode 12 and the positive electrode 14 to prevent physical contact between the two electrodes 12, 14 and the occurrence of a short circuit. The separator 16, in addition to providing a physical barrier between the two electrodes 12, 14, ensures passage of lithium ions (identified by the black dots and by the open circles having a (+) charge in FIG. 4) and related anions (identified by the open circles having a (−) charge in FIG. 4) through an electrolyte solution filling its pores. The chelating agent 15 present in the matrix of the separator 16 also effectively traps and immobilizes the unwanted metal cations (e.g., $Mn^{2+}$) to prevent the migration of these metal cations through the electrolyte solution and to the negative electrode 12.

The negative electrode 12 may include any lithium host active material that can sufficiently undergo lithium intercalation and deintercalation while functioning as the negative terminal of the lithium ion battery 10. Examples of the lithium host active material include graphite or a low surface area amorphous carbon. Graphite is widely utilized to form the negative electrode 12 because it exhibits favorable lithium intercalation and deintercalation characteristics, is relatively non-reactive, and can store lithium in quantities that produce a relatively high energy density. Commercial forms of graphite that may be used to fabricate the negative electrode 12 are available from, for example, Timcal Graphite & Carbon (Bodio, Switzerland), Lonza Group (Basel, Switzerland), or Superior Graphite (Chicago, Ill.). Other materials can also be used to form the negative electrode including, for example, lithium titanate, silicon or silicon-carbon composites, and tin oxide.

The negative electrode 12 may also include a polymer binder material intermingled with the lithium host active material to structurally hold the lithium host active material together. Examples of the binder include polyvinylidene fluoride (PVdF), an ethylene propylene diene monomer (EPDM) rubber, or carboxymethyl cellulose (CMC). These materials (i.e., the lithium host active material and the binder) may be mixed with a high surface area carbon, such as acetylene black, to ensure electron conduction between the current collector (shown as 12a in FIG. 4) and the active material particles of the negative electrode 12. The negative-side current collector 12a may be formed from copper or any other appropriate electrically conductive material known to skilled artisans.

The positive electrode 14 in this example of the lithium ion battery 10 is similar to structure 25 previously described in reference to FIG. 3. In short, the positive electrode 14 may include any of the lithium transition metal based active materials 19, conductive carbons 21, and binders 23 previously described.

Adjacent to the positive electrode 14 is the positive-side current collector 14a, which may be formed from aluminum or any other appropriate electrically conductive material known to skilled artisans.

The negative-side current collector 12a and the positive-side current collector 14a may be positioned in contact with the negative electrode 12 and the positive electrode 14, respectively, to collect and move free electrons to and from an interruptible external circuit 18, which connects the negative electrode 12 and the positive electrode 14.

Each of the negative electrode 12, the positive electrode 14, and the porous separator 16 are soaked in an electrolyte solution. It is to be understood that any appropriate electrolyte solution that can conduct lithium ions between the negative electrode 12 and the positive electrode 14 may be used in the lithium ion battery 10. In one example, the electrolyte solution may be a non-aqueous liquid electrolyte solution that includes a lithium salt dissolved in an organic solvent or a mixture of organic solvents. Skilled artisans are aware of the many non-aqueous liquid electrolyte solutions that may be employed in the lithium ion battery 10 as well as how to manufacture or commercially acquire them. Examples of lithium salts that may be dissolved in an organic solvent to form the non-aqueous liquid electrolyte solution include $LiClO_4$, $LiAlCl_4$, LiI, LiBr, LiSCN, $LiBF_4$, $LiB(C_6H_5)_4$, $LiCF_3SO_3$, $LiN(CF_3SO_2)_2$ (LiTFSI), $LiN(FSO_2)_2$(LiFSI), $LiAsF_6$, $LiPF_6$, $LiB(C_2O_4)_2$ (LiBOB), $LiBF_2(C_2O_4)$(LiODFB), $LiPF_4(C_2O_4)$(LiFOP), $LiNO_3$, and mixtures thereof. These and other similar lithium salts may be dissolved in a variety of organic solvents such as cyclic carbonates (ethylene carbonate, propylene carbonate, butylene carbonate, fluoroethylene carbonate), linear carbonates (dimethyl carbonate, diethyl carbonate, ethylmethyl carbonate), aliphatic carboxylic esters (methyl formate, methyl acetate, methyl propionate), γ-lactones (γ-butyrolactone, γ-valerolactone), chain structure ethers (1,2-dimethoxyethane, 1,2-diethoxyethane, ethoxymethoxyethane), cyclic ethers (tetrahydrofuran, 2-methyltetrahydrofuran), and mixtures thereof.

The electrolyte solution may also include a number of additives, such as solvents and/or salts that are minor components of the solution. Example additives include lithium bis(oxalato borate (LiBOB), lithium difluoro oxalate borate (LiDFOB), vinylene carbonate, monofluoroethylene carbonate, propane sultone, 2-propyn-ol-methanesulfonate, methyl di-fluoro-acetate, succinic anhydride, maleic anhydride, adiponitrile, biphenyl, ortho-terphenyl, dibenzyl, diphenyl ether, n-methylpyrrole, furan, tiophene, 3,4-ethylenedioxythiophene, 2,5-dihydrofuran, trishexafluoro-isopropylphosphate, trihydroxybenzene, tetramethoxytitanium, etc. While some examples have been given herein, it is to be understood that other additives could be used. When included, additives may make up from about 0.05% to about 5% of the composition of the electrolyte solution.

Other electrolytes may be used instead of the electrolyte solution. As examples, polymer electrolytes, ionic liquids, melt electrolytes, or the like may be used. As examples, polymer electrolytes, ionic liquids, melt electrolytes, or the like may be used. Some specific examples of ionic liquids include 1-ethyl-3-methylimidazolium bis(fluorosulfonyl)imide, 1-ethyl-3-methylimidazolium bis(trifluoromethane sulfonyl)imide, phosphonium bis(trifluoromethane sulfonyl)imide, phosphonium bis(fluorosulfonyl)imide, triethyl(methoxymethyl)phosphonium bis(trifluoromethylsulfonyl)imide, triethyl(2-methoxyethyl)phosphonium, and bis(trifluoromethylsulfonyl)imide. Some examples of melt electrolytes include lithium bis(fluorosulfonyl)imide in dimethylmethanesulfonamide and lithium bis(trifluoromethane sulfonyl)imide in dimethylmethanesulfonamide. While some examples have been given herein, it is to be understood that other polymer electrolytes, ionic liquids, and melt electrolytes could be used.

The lithium ion battery 10 may support a load device 22 that can be operatively connected to the external circuit 18. The load device 22 receives a feed of electrical energy from the electric current passing through the external circuit 18 when the lithium ion battery 10 is discharging. While the load device 22 may be any number of known electrically-powered devices, a few specific examples of a power-consuming load device include an electric motor for a hybrid vehicle or an all-electrical vehicle, a laptop computer, a cellular phone, and a cordless power tool. The load device 22 may also, however, be an electrical power-generating apparatus that charges the lithium ion battery 10 for purposes of storing energy. For instance, the tendency of windmills and solar panels to variably and/or intermittently generate electricity often results in a need to store surplus energy for later use.

The lithium ion battery 10 may also include a wide range of other components that, while not depicted here, are nonetheless known to skilled artisans. For instance, the lithium ion battery 10 may include a casing, gaskets, terminals, tabs, and any other desirable components or materials that may be situated between or around the negative electrode 12 and the positive electrode 14 for performance-related or other practical purposes. Moreover, the size and shape of the lithium ion battery 10, as well as the design and chemical make-up of its main components, may vary depending on the particular application for which it is designed. Battery-powered automobiles and hand-held consumer electronic devices, for example, are two instances where the lithium ion battery 10 would most likely be designed to different size, capacity, and power-output specifications. The lithium ion battery 10, or a plurality of lithium ion batteries, may also be connected in series and/or in parallel with other similar lithium ion batteries to produce a greater voltage output and current (if arranged in parallel) or voltage (if arranged in series) if the load device 22 so requires.

The lithium ion battery 10 generally operates by reversibly passing lithium ions between the negative electrode 12 and the positive electrode 14. In the fully charged state, the voltage of the battery 10 is at a maximum (typically in the range 2.0V to 5.0V); while in the fully discharged state, the voltage of the battery 10 is at a minimum (typically in the range 0V to 2.0V). Essentially, the Fermi energy levels of the active materials in the positive and negative electrodes 14, 12 change during battery operation, and so does the difference between the two, known as the battery voltage. The battery voltage decreases during discharge, with the Fermi levels getting closer to each other. During charge, the reverse process is occurring, with the battery voltage increasing as the Fermi levels are being driven apart. During battery discharge, the external load device 22 enables an electronic current flow in the external circuit 18 with a direction such that the difference between the Fermi levels (and, correspondingly, the cell voltage) decreases. The reverse happens during battery charging: the battery charger forces an electronic current flow in the external circuit 18 with a direction such that the difference between the Fermi levels (and, correspondingly, the cell voltage) increases.

At the beginning of a discharge, the negative electrode 12 of the lithium ion battery 10 contains a high concentration of intercalated lithium while the positive electrode 14 is relatively depleted. When the negative electrode 12 contains a sufficiently higher relative quantity of intercalated lithium, the lithium ion battery 10 can generate a beneficial electric current by way of reversible electrochemical reactions that occur when the external circuit 18 is closed to connect the negative electrode 12 and the positive electrode 14. The establishment of the closed external circuit under such circumstances causes the extraction of intercalated lithium from the negative electrode 12. The extracted lithium atoms are split into lithium ions (identified by the black dots and by the open circles having a (+) charge) and electrons ($e^-$) as they leave an intercalation host at the negative electrode-electrolyte interface.

The chemical potential difference between the positive electrode 14 and the negative electrode 12 (ranging from about 2.0V to about 5.0V, depending on the exact chemical make-up of the electrodes 14, 12) drives the electrons ($e^-$) produced by the oxidation of intercalated lithium at the negative electrode 12 through the external circuit 18 towards the positive electrode 14. The lithium ions, which are also produced at the negative electrode 12, are concurrently carried by the electrolyte solution through the porous separator 16 towards the positive electrode 14. The electrons ($e^-$) flowing through the external circuit 18 and the lithium ions migrating across the separator 16 in the electrolyte solution eventually reconcile and form intercalated lithium at the positive electrode 14. The electric current passing through the external circuit 18 can be harnessed and directed through the load device 22 until the level of intercalated lithium in the negative electrode 12 falls below a workable level or the need for electrical energy ceases.

The lithium ion battery 10 can be charged or re-powered at any time after a partial or full discharge of its available capacity by applying an external battery charger to the lithium ion battery 10 to reverse the electrochemical reactions that occur during battery discharge. The connection of an external power source to the lithium ion battery 10 compels the otherwise non-spontaneous oxidation of lithium transition metal oxide or phosphate at the positive electrode 14 to produce electrons and release lithium ions. The electrons, which flow back towards the negative electrode 12 through the external circuit 18, and the lithium ions, which are carried by the electrolyte across the microporous polymer separator 16 back towards the negative electrode 12, reunite at the negative electrode 12 and replenish it with intercalated lithium for consumption during the next battery discharge cycle.

The external battery charger that may be used to charge the lithium ion battery 10 may vary depending on the size, construction, and particular end-use of the lithium ion battery 10. Some suitable external battery chargers include a battery charger plugged into an AC wall outlet and a motor vehicle alternator.

Referring now to FIG. 5, another example of the lithium ion battery 10' is depicted. This example includes the separator 16' shown in FIG. 2 disposed between a negative electrode 12 and a positive electrode 14. As discussed above, the coating 24 on the membrane 26 of the separator 16' is formed of the poly(undecylenyl-macrocycle).

In this example, the separator 16' operates as both an electrical insulator and a mechanical support, and is sandwiched between the negative electrode 12 and the positive electrode 14 to prevent physical contact between the two electrodes 12, 14 and the occurrence of a short circuit. The separator 16 ensures passage of lithium ions (identified by the black dots and by the open circles having a (+) charge in FIG. 5) and related anions (identified by the open circles having a (−) charge in FIG. 5) through an electrolyte solution filling its pores. The chelating agent 15 present in the coating 24 of the separator 16' also effectively traps and immobilizes the unwanted metal cations (e.g., $Mn^{2+}$) to prevent the migration of these metal cations through the electrolyte solution and to the negative electrode 12.

The other components (e.g., the electrodes 12, 14, current collectors 12a, 14a, external circuit 18, load 22, etc.) and the operation of the battery 10' are similar to the components previously described herein in reference to the battery 10 and the operation of the battery 10.

Referring now to FIG. 6, still another example of the lithium ion battery 10" is depicted. This example includes the positive electrode 14' shown in FIG. 3 disposed so that the coating 24 is adjacent to one side of the porous membrane 26 (which, in this example, functions as a separator). As discussed above, the coating 24 on the structure 25 of the positive electrode 14' is formed of the poly(undecylenyl-macrocycle).

In this example, the membrane 26 operates as both an electrical insulator and a mechanical support, and is sandwiched between the negative electrode 12 and the positive electrode 14' to prevent physical contact between the two electrodes 12, 14' and the occurrence of a short circuit. The membrane 26 ensures passage of lithium ions (identified by the black dots and by the open circles having a (+) charge in FIG. 6) and related anions (identified by the open circles having a (−) charge in FIG. 6) through an electrolyte solution filling its pores. Any examples of the membrane 26 previously described may be used in this example of the battery 10".

As mentioned above, the coating 24 of the positive electrode 14' is positioned adjacent to the membrane 26. In this example, the chelating agent 15 present in the coating 24 of the positive electrode 14' effectively traps and immobilizes the unwanted metal cations (e.g., $Mn^{2+}$) to prevent the migration of these metal cations through the membrane 26 (and the electrolyte solution) and to the negative electrode 12.

The other components (e.g., the electrode 12, current collectors 12a, 14a, external circuit 18, load 22, etc.) and the operation of the battery 10" are similar to the components previously described herein in reference to the battery 10 and the operation of the battery 10.

To further illustrate the present disclosure, examples are given herein. It is to be understood that these examples are provided for illustrative purposes and are not to be construed as limiting the scope of the disclosure.

EXAMPLES

Preparation of Lithium Undecylenate

The monomer, undecylenic acid-trimethylsilyl ester, and poly(undecylenic acid) were prepared. To a 3-liter three necked round bottom flask equipped with an addition funnel, mechanical stirrer, and reflux condenser, undecylenic acid (480 grams, 2.6 mol), pyridine (240 grams, 3.03 mol) and toluene (900 milliliters) were added. Thionyl chloride (326 grams, 3.0 mol) was then added slowly via the addition funnel over 2.5 hours. After stirring at 25° C. for 16 hours, the precipitate was filtered off and washed with toluene.

The filtrates were combined and toluene was removed using a rotary evaporator. The residue was distilled and collected from 25° C. to 115° C. at about 1 millimeter of mercury. A second cut was collected between 115° C. and 119° C. at about 1 millimeter of mercury. A third cut, collected at between 115° C. and 120° C. at about 1 millimeter mercury, was identified by IR spectroscopy (1,640 $cm^{-1}$, carbonyl ester C=O), $^{13}C$ and $^1H$ spectrometries as the trimethylsilyl ester of undecylenic acid (320.4 grams) with no indication of the presence of the free acid.

Toluene (63 g), trimethylsilyl undecylenic acid ester (10 g), and hexane (5 g) were added to a glass screw top jar. Diethylaluminum chloride (1.8 molar solution in toluene, 48 mL) and $TiCl_3$.AA (Alfa, 2 teaspoons) were added under an argon atmosphere. The reaction mixture was stirred for 16 hours. Methanol was then added dropwise until the mixture turned green. The green reaction mixture was then added to methanol/hydrochloric acid in a Waring blender to precipitate the solid polymer. After washing with methanol, then water and then methanol in a blender followed by filtration, the isolated polymer was dried in vacuo to yield 2.6 g of the semicrystalline copolymer product. The polymer was immersed in aqueous lithium chloride and titrated with aqueous lithium hydroxide until pH 8 was obtained. This was followed by washing with water until the pH of the water washings was neutral to yield poly(lithium undecylenate).

Preparation of Poly(Lithium Undecylenate-Hexene) Copolymer

A copolymer of hexene and undecylenic acid (reacted as the protected trimethyl silyl ester group that is subsequently removed with acid) was made using a Ziegler-Natta isotactic catalyst. About 50% of the undecylenic acid as the trimethyl silyl ester charged was incorporated into the polymer chain. Toluene (63 g), trimethylsilyl undecylenic acid ester (5 g), and hexane (5 g) was added to a glass screw top jar. Diethyl aluminum chloride (1.8 molar solution in toluene, 22 mL) and $TiCl_3$.AA (Alfa, 2 teaspoons) were added under an argon atmosphere. The reaction mixture was stirred for 16 hours. Methanol was then added dropwise until the mixture turned green. The green reaction mixture was then added to methanol/hydrochloric acid in a Waring blender to precipitate the solid polymer. After washing with methanol, then water and then methanol in a blender followed by filtration, the isolated polymer was dried in vacuo to yield the semicrystalline copolymer product, poly(25% undecylenic acid-hexene). The polymer was immersed in aqueous lithium chloride and titrated with aqueous lithium hydroxide until pH 8, followed by washing with water until the pH of the water washings was neutral.

Preparation of Poly(Undecylenoyl Chloride)

To a 250-mL round bottom flask equipped with an addition funnel, condenser with drying tube, methylene chloride (100 mL), poly(undecylenyl acid) (2 g, 0.0109 mol), and pyridine (0.86 g, 0.0109 mol) were added. Thionyl chloride (1.3 g, 0.0109 mol) was then added drop-wise. After complete addition, the mixture was refluxed for 24 hours. The reaction mixture was filtered and the solvent was removed using a rotary evaporator to yield poly(undecylenoyl chloride). It is to be understood that partial conversion of the acid to the acid chloride can be accomplished by using less thionyl chloride.

Reaction of Poly(Undecylenoyl Chloride) and 1-Aza-15-Crown-5 & Battery Separator Coated with Reaction Product 1-aza-15-crown-5 (2.5 g, 0.0114 mol) and tetrahydrofuran (40 mL, freshly distilled from blue, sodium benzophenone ketyl) were added, under argon, to a 500-mL Schlenk flask cooled in an ice bath and equipped with a magnetic stirrer and a rubber septum. Then, 1.6 molar n-butyllithium in THF (Aldrich, 7.2 mL, 0.0115 mol) was added via a gas-tight syringe. After 30 minutes, poly(undecylenyl chloride) (2 g, 0.009877 mol) in freshly distilled tetrahydrofuran (50 mL) was then added all at once. The mixture was stirred for 5 days and then was added to methanol (500 mL) to precipitate the polymer, poly(N-undecylenylamido-1-aza-15-crown-5).

The same product would be obtained if poly(undecylenoyl chloride) (2 g, 0.009877 mol) were allowed to react with 1-aza-15-crown-5 (0.0217 mol, 4.76 g) in tetrahydrofuran (90 mL) at 23° C. for 2 weeks.

The polymer (poly(N-undecylenylamido-1-aza-15-crown-5, 1 g) in THF (100 mL) was homogenized with an IKA Turrax t25® homogenizer and coated onto a CEL-GARD® 2320 membrane and was used as a battery separator in a lithium ion battery. This battery showed a 0.5-reduced capacity loss during a 40° C. charge-discharge accelerated aging test.

Battery Separator Made with Poly(Lithium Undecylenate-N-Aza-15-Crown-5-Undecylenyl Amide) and Expanded Polytetrafluoroethylene (ePTFE)

Poly(lithium undecylenate-N-aza-15-crown-5-undecylenyl amide) (1 g) and lithium chloride (1 g) were suspended in a 1:1 mixture of propanol and water (20 mL) using an IKA Turrax t25 homogenizer. A 3-mil Bird applicator with masking tape used as a shim was used to apply a wet film of the dispersion onto a two-sided TFE-coated Kapton film (American Durofilm) used as a backer sheet. Expanded polytetrafluoroethylene (Linqiao) stretched on an embroidery frame was laid on top of the wet film, and the dispersion imbibed into the expanded polytetrafluoroethylene. An optional second coating of the dispersion is then applied on top of this composite using a 3-mil Bird applicator with masking tape used as a shim. After heating at 80° C. until dry on a heated platen, the product was removed from the backer to produce a free standing film which is rendered microporous by soaking in de-ionized water for 16 hours. The microporous poly(lithium undecylenate) with ePTFE film was used as a battery separator in lithium ion battery. This supported microporous membrane was more mechanically robust that one without the ePTFE, and when used as a separator in a lithium ion battery showed a 0.5-reduced capacity loss during a 40° C. charge-discharge accelerated aging test.

It is to be understood that the ranges provided herein include the stated range and any value or sub-range within the stated range. For example, a range from about 25° C. to about 115° C. should be interpreted to include not only the explicitly recited limits of about 25° C. to about 115° C., but also to include individual values, such as 29.5° C., 100° C. etc., and sub-ranges, such as from about 50° C. to about 110° C., etc. Furthermore, when "about" is utilized to describe a value, this is meant to encompass minor variations (up to +/−5%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it will be apparent to those skilled in the art that the disclosed examples may be modified. Therefore, the foregoing description is to be considered non-limiting.

The invention claimed is:

1. A lithium ion battery separator, comprising:
a microporous film of a polymeric chelating agent, the polymeric chelating agent including a poly(undecylenyl-macrocycle), wherein the poly(undecylenyl-macrocycle) includes a polymer backbone, a first functional group including an amide or an ester, and a macrocycle that is a chelating agent.

2. The lithium ion battery separator as defined in claim 1 wherein the chelating agent is selected from the group consisting of a crown ether, a crown ether having at least one ether oxygen substituted with a heteroatom, a podand, a lariat ether, a calixarene, a calixcrown, or combinations thereof.

3. The lithium ion battery separator as defined in claim 1 wherein the chelating agent is selected from the group consisting of

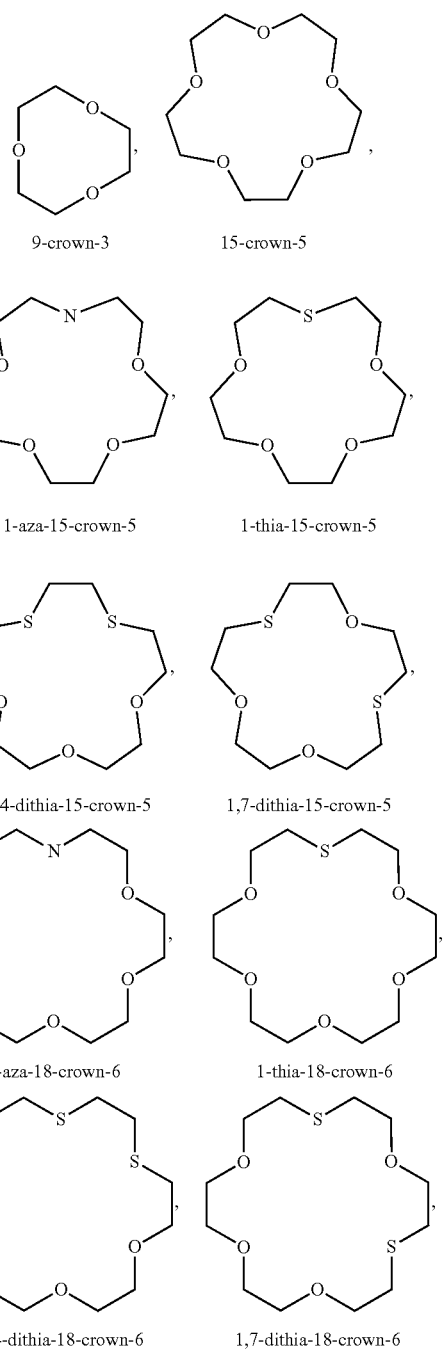

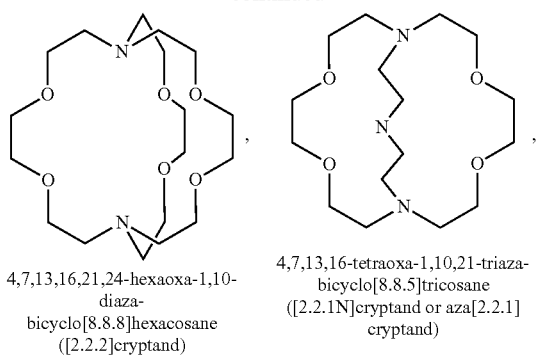

4,7,13,16,21,24-hexaoxa-1,10-diaza-bicyclo[8.8.8]hexacosane ([2.2.2]cryptand)

4,7,13,16-tetraoxa-1,10,21-triaza-bicyclo[8.8.5]tricosane ([2.2.1N]cryptand or aza[2.2.1] cryptand)

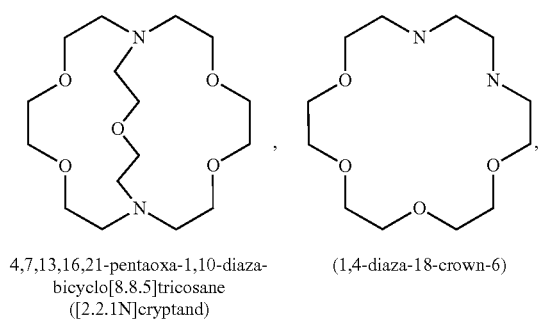

4,7,13,16,21-pentaoxa-1,10-diaza-bicyclo[8.8.5]tricosane ([2.2.1N]cryptand)

(1,4-diaza-18-crown-6)

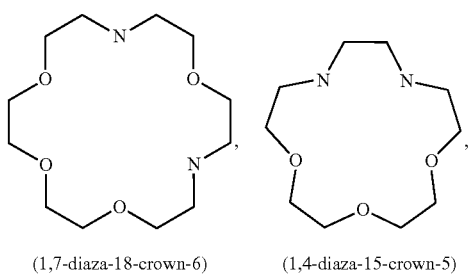

(1,7-diaza-18-crown-6)

(1,4-diaza-15-crown-5)

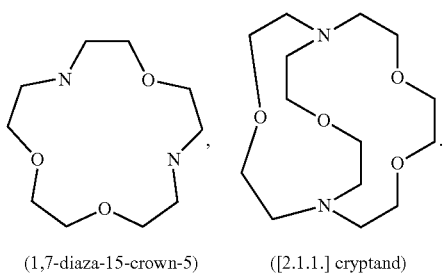

(1,7-diaza-15-crown-5)

([2.1.1.] cryptand)

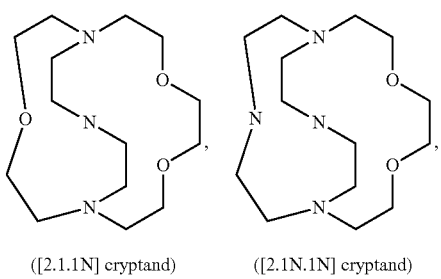

([2.1.1N] cryptand)

([2.1N.1N] cryptand)

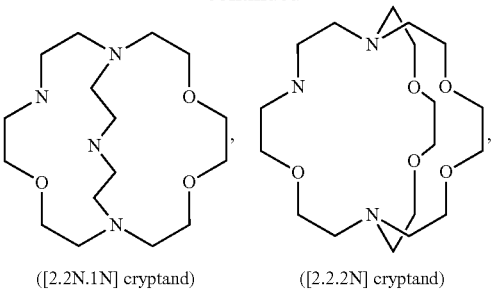

([2.2N.1N] cryptand)

([2.2.2N] cryptand)

[2.2N.2N]cryptand, and combinations thereof.

4. The lithium ion battery separator as defined in claim 1, further comprising a porous polymer membrane, wherein the porous film is a coating on a surface of the porous polymer membrane.

5. A lithium ion battery, comprising:

a positive electrode;

a negative electrode;

a microporous polymer separator soaked in an electrolyte solution, the microporous polymer separator disposed between the positive electrode and the negative electrode; and a polymeric chelating agent including a poly(undecylenyl-macrocycle) wherein:

the poly(undecylenyl-macrocycle) includes a polymer backbone, a first functional group including an ester or an amide, and a macrocycle that is a chelating agent; and the polymeric chelating agent is i) deposited onto a surface of the positive electrode, or ii) incorporated as the microporous polymer separator, or iii) deposited onto a surface of a porous polymer membrane to form the microporous polymer separator.

6. The lithium ion battery as defined in claim 5 wherein the chelating agent is selected from the group consisting of a crown ether, a crown ether having at least one ether oxygen substituted with a heteroatom, a podand, a lariat ether, a calixarene, a calixcrown, or combinations thereof.

7. The lithium ion battery as defined in claim 5 wherein the poly(undecylenyl-macrocycle) is deposited onto the surface of the porous polymer membrane, and wherein the porous polymer membrane is selected from the group consisting of a porous polypropylene membrane, a porous polyethylene membrane, and an expanded polytetrafluoroethylene membrane.

8. The lithium ion battery as defined in claim 5 wherein the chelating agent is selected from the group consisting of

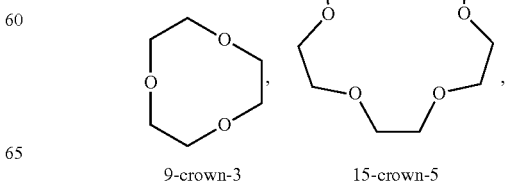

9-crown-3

15-crown-5

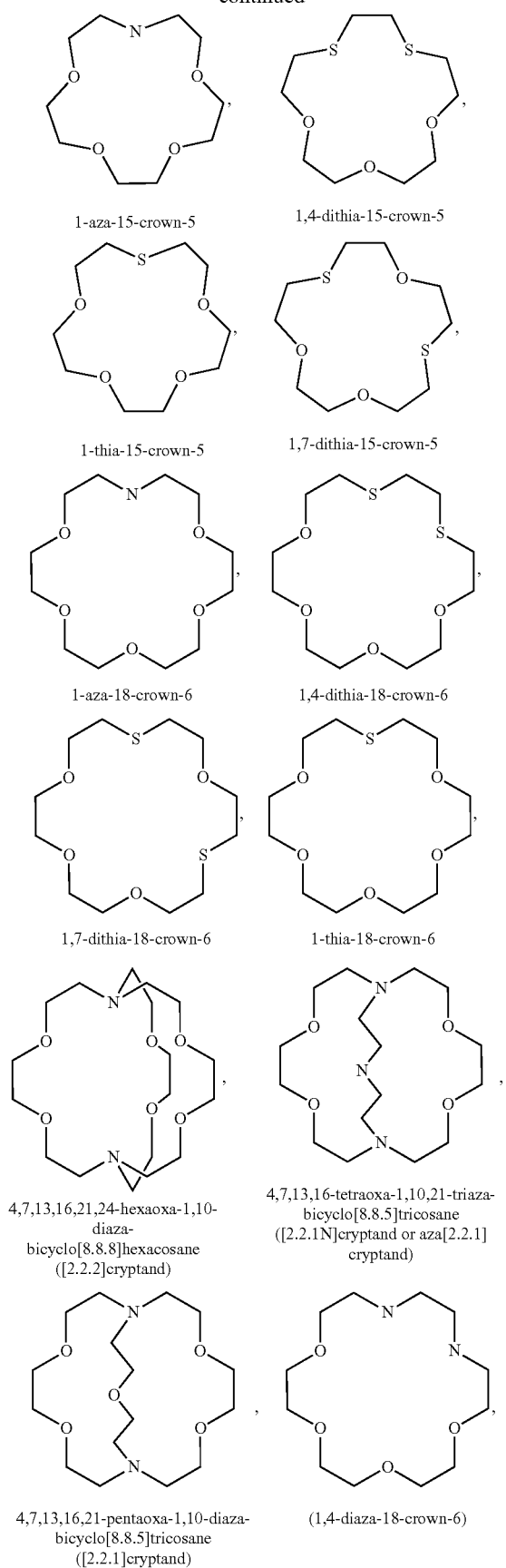
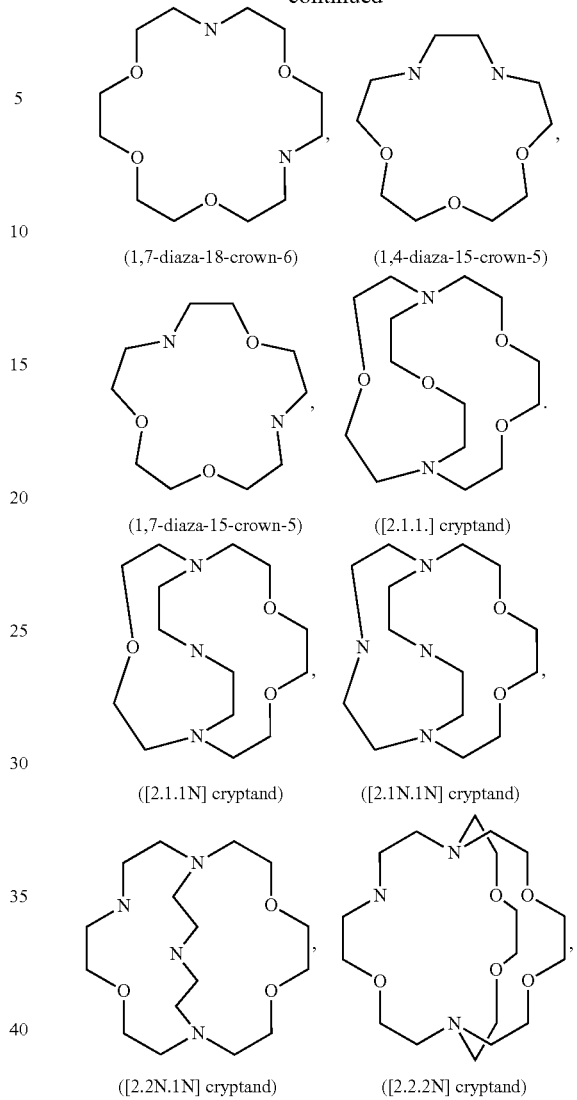

[2.2N.2N]cryptand, and combinations thereof.

9. A method of forming a polymeric chelating agent for a lithium ion battery, the method comprising:
  polymerizing trimethylsilyl undecylenate via Ziegler-Natta polymerization in the presence of a Ziegler-Natta catalyst to form poly(undecylenic acid); and
  functionalizing the polyundecylenic acid with a chelating agent by:
    reacting the polyundecylenic acid with thionyl chloride and pyridine to form poly(undecylenoyl chloride);
    forming a reaction mixture of the poly(undecylenoyl chloride) and a chelating agent precursor in salt form; and
    exposing the reaction mixture to an aqueous base to hydrolyze any unreacted chloride groups of poly(undecylenoyl chloride);
  whereby the functionalization process attaches the chelating agent, through any of ester and amide groups, to the poly(undecylenoyl chloride) to form a poly(undecylenyl-macrocycle) that includes a polymer backbone, a first functional group including an amide or an ester, and a macrocycle that is a chelating agent, wherein the poly(undecylenyl-macrocycle) forms a microporous film.

10. The method as defined in claim 9 wherein:
the polymerizing step forms a poly(undecylenic acid) olefin copolymer; and
the polymerization step involves the trimethylsilyl undecylenate and an other olefin.

11. The method as defined in claim 9 wherein prior to the reacting steps, the method further comprises converting the polyundecylenic acid into a porous film using melt processing.

12. The method as defined in claim 9 wherein after the reacting steps, the method further comprises converting the polymeric chelating agent into a porous film using melt processing.

13. The method as defined in claim 9 wherein the aqueous base is lithium hydroxide.

14. The lithium ion battery separator as defined in claim 1 wherein the first functional group links the macrocycle to the polymer backbone.

15. The lithium ion battery separator as defined in claim 1 wherein:
the undecylenyl-macrocycle further includes a second functional group;
the second functional group includes an alkyl, an ester, an amide, an ether, or an isocyanate; and
the second functional group links the macrocycle to the polymer backbone.

16. The lithium ion battery separator as defined in claim 5 wherein the first functional group links the macrocycle to the polymer backbone.

17. The lithium ion battery separator as defined in claim 5 wherein:
the undecylenyl-macrocycle further includes a second functional group;
the second functional group includes an alkyl, an ester, an amide, an ether, or an isocyanate; and
the second functional group links the macrocycle to the polymer backbone.

* * * * *